United States Patent [19]
Röder et al.

[11] Patent Number: 5,647,547
[45] Date of Patent: Jul. 15, 1997

[54] PAPER SUPPLY ROLL LEADING EDGE SECUREMENT

[75] Inventors: Klaus Walter Röder; Wolfgang Günter Ruckmann, both of Würzburg, Germany

[73] Assignee: Koenig & Bauer Aktiengesellschaft, Wurzburg, Germany

[21] Appl. No.: 502,771

[22] Filed: Jul. 14, 1995

[30]     Foreign Application Priority Data

Jul. 14, 1994 [DE]   Germany .................. 44 24 657.9

[51] Int. Cl.⁶ .................................. B65H 19/18
[52] U.S. Cl. .......................... 242/160.1; 242/556.1; 156/504
[58] Field of Search ............... 242/160.1, 554.4, 242/556, 556.1, 563, 580, 583; 156/504

[56]           References Cited

U.S. PATENT DOCUMENTS

| | | |
|---|---|---|
| 3,806,388 | 4/1974 | Contini . |
| 4,177,960 | 12/1979 | Nakagawa ............... 242/554.4 |
| 4,543,152 | 9/1985 | Nozaka ................... 242/554.4 |
| 4,575,017 | 3/1986 | Pali ....................... 242/554.4 |
| 4,688,736 | 8/1987 | Brinker . |
| 5,348,793 | 9/1994 | Stettner . |
| 5,356,496 | 10/1994 | Lincoln et al. .......... 156/504 |

FOREIGN PATENT DOCUMENTS

| | | | |
|---|---|---|---|
| 1 815 782 | 11/1969 | Germany . | |
| 29 27 575 | 1/1980 | Germany . | |
| 284 206 A5 | 11/1990 | Germany | ..... 242/554.4 |
| 41 18 690 | 5/1993 | Germany . | |
| 42 25 465 | 2/1994 | Germany . | |
| 1-150666 | 6/1989 | Japan | ..... 242/556.1 |
| 888570 | 1/1962 | United Kingdom | ..... 242/556.1 |
| 1 435 629 | 5/1976 | United Kingdom | ..... 242/554.4 |
| 2 257 931 | 1/1993 | United Kingdom . | |

OTHER PUBLICATIONS

Patent Abstracts of Japan; JP-A-56-062863; vol. 5, No. 128; May 29, 1981.

*Primary Examiner*—John P. Darling
*Attorney, Agent, or Firm*—Jones, Tullar & Cooper, P.C.

[57]            ABSTRACT

A paper supply roll leading edge securement, which is usable particularly during a flying roll change, utilizes an adhesive having sensor detectable constituents. This adhesive can be applied to or across the leading edge of the first layer of the paper web on the supply roll. The use of the sensor detectable constituents facilitates proper positioning of the paper supply roll and helps separate faulty products from the production stream.

6 Claims, 1 Drawing Sheet

PAPER SUPPLY ROLL LEADING EDGE SECUREMENT

FIELD OF THE INVENTION

The present invention is directed generally to a paper supply roll leading edge securement. More particularly, the present invention is directed to a material usable for the securement of the leading edge of a paper supply roll. Most specifically, the present invention is directed to a paper supply roll leading edge securement using a material which can be detected by sensors. The material may be a hot melt adhesive that has been provided with sensor detectable constituents such as ceramic ferrite, metal particles or detectable color components. Each of these materials is detectable by a suitable sensor and thus allows the presence of the adhesive to be detected by other than human observation. It is thus possible to insure that the leading portion of a first layer of the paper web on a paper supply roll has been secured to a second layer of the paper web.

DESCRIPTION OF THE PRIOR ART

In the operation of web-fed printing presses, the paper web is supplied from a large paper supply roll. As the paper web is withdrawn from the supply roll, it eventually becomes necessary to switch the web feed from a first, now depleted paper supply roll to a second, fresh paper supply roll. In order to maintain production speed and to avoid the need to stop and start the printing press each time a change in paper supply roll must be made, such changes are accomplished with the press operating at full speed. These paper supply roll changes are typically accomplished in what is called a flying roll change. In such a change, a leading edge of a new paper supply roll, which roll has been brought up to an appropriate rotational speed, is adhered to the web from the now nearly depleted supply roll. Various arrangements of tapes and adhesives are known for use in accomplishing the adherence of the leading end of a fresh paper supply roll to the web from a dwindling roll.

One method and an associated device for preparing a gluing point of a material supply roll for a flying roll change is set forth in German Patent Publication DE 41 18 690 C2. In this procedure, the start of the first layer of paper on the supply roll is provided with a perforation in the form of a line that is parallel to, and spaced from the leading edge of the material web. A holding adhesive is applied to the undersurface of the first layer between its leading edge and the perforation. This holding adhesive attaches the first layer to the second layer of paper on the paper supply roll. A connecting adhesive is applied to the outer surface of the first layer behind or after the perforation, as viewed in the direction of paper web travel. This connecting adhesive is used to glue the first layer of the new paper supply roll to the web from the depleted paper roll during a flying roll change. The holding adhesive is intended to hold the paper supply roll tightly wound and to prevent the leading edge from unrolling during handling and transport of the paper supply roll.

One limitation of this prior art method and device is that it is not possible to readily ascertain whether or not the holding adhesive has been applied to the undersurface of the first paper web layer on the fresh paper supply roll. If this holding adhesive has not been applied, it may be possible that the connection between the leading edge of the fresh paper supply roll and the web from the depleting paper supply roll will not be made. This will result in an exhausting of the paper web and the need to shut down the press while a fresh web is fed through the press.

It will thus be seen that a need exists for a material for attaching the start of a paper supply roll which overcomes the limitations of the prior art. The paper supply roll leading edge securement in accordance with the present invention accomplishes that result and is a significant improvement over the prior art.

SUMMARY OF THE INVENTION

It is an object of the present invention to provide a paper supply roll leading edge securement.

Another object of the present invention is to provide a material for attaching the leading edge of a paper supply roll.

A further object of the present invention is to provide a paper supply roll leading edge securement which is detectable by sensors.

Still another object of the present invention is to provide a material for the attachment of a start of a first layer of a supply paper roll to a second layer of the paper web with this material being detectable by sensors.

Yet a further object of the present invention is to provide a paper supply roll leading edge securement using a material which can be applied in various configurations.

As will be discussed in detail in the description of the preferred embodiments which are set forth subsequently, the paper supply roll leading edge securement in accordance with the present invention is accomplished by the use of a hot melt or similar adhesive that has been provided with sensor detectable constituents. These constituents or components can be ceramic ferrite, particles of metal or colors.

The constituent or component which is added to the adhesive makes it detectable by sensors. This allows the detection of the paper supply roll leading edge securement by use of suitable sensors and without direct operator inspection. Because the ceramic ferrite, metal particle or color components have been added to the adhesive, it is possible to determine, by the use of sensors and suitable controls, the presence of the adhesive on the paper supply roll. Once it has been ascertained that the leading edge securement has been applied and that the fresh paper supply roll is properly positioned on the roll stand, a connecting adhesive can be automatically applied to the outer surface of the first layer of the paper supply roll either at or adjacent the leading edge. This insures that the flying roll change can be made properly.

The inclusion in the adhesive of the sensor detectable constituents provides another benefit. After the flying roll change has been made, one or two of the printed products from the web-fed press will be faulty since they will include the adhered together leading and depleting web segments and will also include the adhesive material. Since this adhesive material includes sensor detectable constituents, suitable sensors can be placed in a position to scan the finished products. A so-called waste shunt can be activated when the sensors detect these constituents so that the faulty products can be shunted out of the stream of finished products.

The paper supply roll leading edge securement in accordance with the present invention overcomes the limitations of the prior art. It is a substantial advance in the art.

BRIEF DESCRIPTION OF THE DRAWINGS

While the novel features of the paper supply roll leading edge securement in accordance with the present invention will be set forth with particularity in the appended claims, a full and complete understanding of the invention may be had by referring to the detailed description of the preferred embodiments which is presented subsequently, and as illustrated in the accompanying drawings, in which:

DETAILED DESCRIPTION OF THE PREFERRED EMBODIMENTS

In the accomplishment of a flying roll change, a fresh paper supply roll is prepared by having an undersurface portion of a leading edge of its first paper web layer attached to the upper surface of the second layer of paper on the roll, and by having an attachment or connecting adhesive applied to the upper surface of the first layer of paper either at or adjacent the leading edge. In the three preferred embodiments depicted in FIGS. 1, 2 and 3, there is shown only a portion of a paper supply roll. It will be understood that these three depictions are of portions of the complete paper supply roll. Each such paper supply roll has a leading edge 6 of a first or outermost paper web layer 2 with this leading edge or start 6 being securable to an outer surface of a second paper web layer 9 of the paper on the supply roll by use of the paper supply roll leading edge securement in accordance with the present invention.

Figure 2:
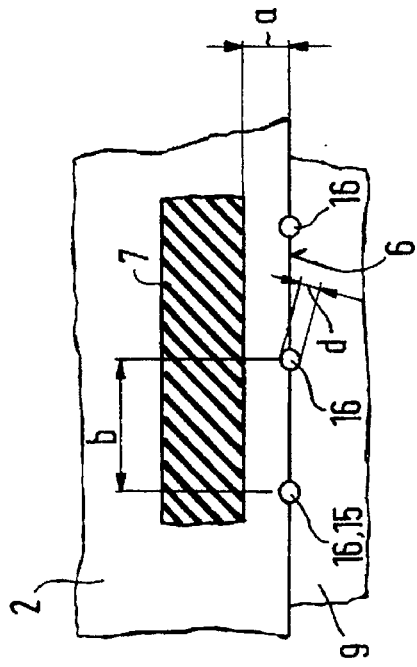
FIG. 2 is a top plan view of a second preferred embodiment of the present invention.
Figure 1:
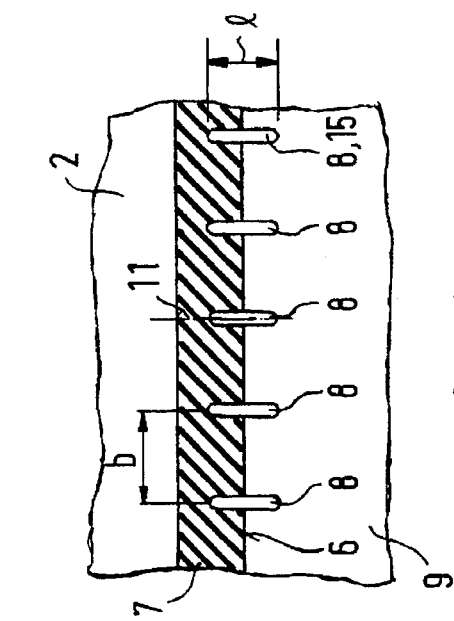
FIG. 1 is a top plan view of a first preferred embodiment of a paper supply roll leading edge securement arrangement in accordance with the present invention.

Referring now primarily to FIG. 1, in the first preferred embodiment of the present invention, the leading edge start 6 of the first layer 2 of the paper web is attached to the second layer 9 of the paper web on the supply roll by the use of a suitable hot melt adhesive 15. The adhesive 15 is applied in a number of drops 16, as seen in FIG. 2. In the first preferred embodiment depicted in FIG. 1, groups of these drops 16 are placed adjacent each other and fuse together to form a string or bead 8. Each such string or bead shaped array 8 of dots 16 of hot melt adhesive 15 is formed in a shape such that is resides partially on the leading edge 6 of the first layer 2 and partially on the second layer 9 with the bead overlying the point of overlap of the first and second layers. It is preferable that half of the elongated bead 8 be placed on the first layer 2 and half on the second layer 9. Each such bead 8 has a linear axis 11 which extends generally in the circumferential direction of the paper supply roll and parallel to the side edges of the paper web. The plurality of elongated beads 8 of the hot melt adhesive 15 are placed across the width of the paper web roll and are spaced at a spacing distance "b" from each other, as is shown in FIG. 1. This distance "b" can be selected as a function of the weight of the paper. These strings or beads 8 of hot melt adhesive 15 each have a length "l" with this length "l" being generally as long as the width of a strip-shaped connecting adhesive 7 which can be applied to the first layer 2 of the paper web either at or adjacent the leading edge 6.

In accordance with the present invention, the hot melt adhesive 15 used in the holding of the first layer 2 to the second layer 9 of the paper supply roll should consist of 100% solid components, should not contain water nor volatile or flammable solutions, should set rapidly after application and should therefore provide rapid attachment and minimal shrinkage. The hot melt adhesive 15 is, in accordance with the present invention, provided with a sensor detectable constituent. This constituent may be a ceramic ferrite component, metal components or may be color components. The component or constituent added to the hot melt adhesive 15 will allow it to be detected by suitable sensors. Thus a sufficient quantity of the selected constituent must be added to the hot melt adhesive so that the presence of the constituent and thus the presence of the adhesive 15 can be detected by the sensor. The hot melt adhesive 15 can be applied to the paper supply roll either manually with a glue gun or by means of a simple mechanical application device. Preferably the hot melt adhesive leading edge securement 15 will be applied in a central paper supply roll make-up or production area.

Figure 3:
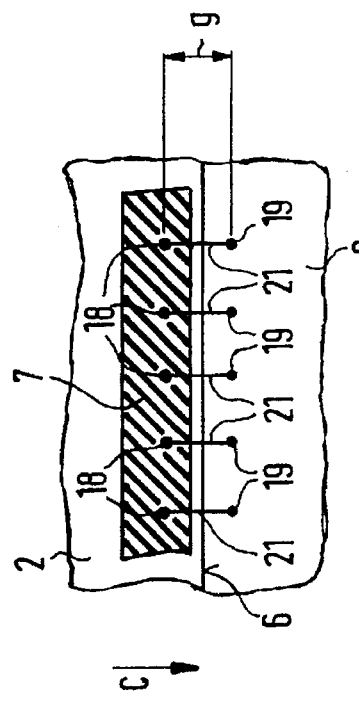
FIG. 3 is a top plan view of a third preferred embodiment of a gluing arrangement of a paper web using the paper supply roll leading edge securement in accordance with the present invention.

As may also be seen in FIG. 1, as well as in FIGS. 2 and 3, once the hot melt securement adhesive 15 has been put in place, a suitable strip-shaped connecting adhesive 7, which is used to connect the outer surface of the leading edge 6 of the first layer 2 of the paper web from the fresh paper supply roll to a web (not shown) from an exhausting paper supply roll, will be applied to the first layer 2 of the paper supply roll. This strip-shaped connecting adhesive 7 is situated parallel to the leading edge or start 6 of the first layer 2 of the paper web and can consist of a generally conventional glue application or of a generally known two-sided glue strip. One of the long sides of the connecting adhesive 7 can extend congruently with the leading edge or start 6 of the first layer 2, as seen in FIG. 1, or can be spaced at a distance "a" from the leading edge or start 6 of the first layer 2 of the paper web, as seen in FIG. 2.

Again referring to FIG. 2, in a second preferred embodiment of the present invention, the leading edge or start 6 of the first layer 2 of the paper web is attached to the second layer 9 by the use of a plurality of circular drops 16 of the hot melt adhesive 15 having the sensor detectable constituent. These drops 16 of the hot melt adhesive 15 are spaced across the width of the paper web at a distance "b" from each other. The spacing "a" of the leading edge of the connecting adhesive 7 from the leading edge 6 of the first layer 2 of the paper web can be up to three times the diameter "d" of one of the hot melt adhesive drops 16. The spacing distance "b" of the individual adhesive drops 16 from each other can be of the same size as discussed in connection with the first preferred embodiment. The application of the drops 16 can take place in the same manner as discussed in connection with the first preferred embodiment. The long side of the connecting adhesive 7 can either be spaced from the leading edge 6 by the distance "a", as shown in FIG. 2, or could be congruent with the leading edge 6, as depicted in FIG. 1. In this second configuration, the hot melt adhesive 15 again is provided with sensor detectable constituents, such as ceramic ferrite, metal particles or a suitable color in an amount sufficient so that their presence will be detected by suitable sensors.

Turning now to FIG. 3, there may be seen a third preferred embodiment of the paper supply roll leading edge securement in accordance with the present invention. In this third preferred embodiment, spaced dots 18 and 19 of hot melt adhesive 15 are applied in the area of the leading edge or start 6 of the first layer 2 and on the second layer 9, generally adjacent the leading edge or start 6. The dots 18 are placed on the first layer 2 and the dots 19 are placed on the second layer 9. When viewed in the direction of longitudinal axis of the supply paper roll, the dots 18 on the first layer 2 of the paper web and the dots 19 on the second layer 9 of the paper web roll are spaced at a distance from each other. In the direction C of the rotation of the paper supply roll and the travel of the paper web being removed from the roll, the dots 18 and 19 are spaced from each other by a distance "g". It is preferable that the distance "g" be generally equally divided between the first layer 2 and the second layer 9 of the paper. In other words, both the dots 18 and 19 are spaced an equal distance from the leading edge 6 of the first layer 2 of the paper supply. The dots 18 and 19 can be placed directly opposite to each other, as depicted in FIG. 3, or can be offset or staggered at intervals from each other. These dots 18 and 19 of the hot melt adhesive 15 contain the same sensor detectable constituents as have been previously discussed in connection with the first and second embodiments.

Each pair of dots 18 and 19 of the hot melt adhesive 15 are connected to each other by suitable threads or strings 21. As may be seen in FIG. 3 these connecting threads or strings 21 extend from their respective glue dot 18 across the leading edge 6 of the first layer 2 of the paper web and to their associated glue dot 19 on the second layer 9 of the paper web. Each of the strings or threads 21 extends generally in the direction of paper web travel, as indicated by arrow C in FIG. 3. Each string 21 typically extends generally straight between its associated first and second glue drops or dots 18 and 19. The individual string or thread segments 21 can be positioned by having the thread ends placed in the hot melt adhesive dots 18 and 19 before these dots or drops harden. It is also possible to use a thread or string 21 which has been coated with the rapidly setting material, such as the hot melt adhesive 15 or which has been enriched or modified to contain particles of the hot melt adhesive 15. These sheathed, coated or enriched strings or threads 21 can be subjected to a frictional contact with a heated tool, such as a heated die. This contact softens the hot melt adhesive 15 on the strings or threads 21 so that they can readily combine with the hot melt adhesive 15 used to form the glue dots or drops 18 and 19.

The strings 21 can be made so that they will tear or break easily. They may consist of a natural fiber, such as cotton or silk to which a proportion of ceramic ferrite components has been added. It is also possible to make the threads or strings 21 of a hard-to-tear material, such as nylon or other synthetic fibers. When the strings or threads are made of these synthetics, a metal insert or a metal thread is included in the string 21. When the strings 21 are of the hard-to-tear variety, one end of the string 21 will break away from one of the glue drops or dots 18 or 19 during a flying roll change. It would also be possible to make the strings or threads 21 out of the hot melt adhesive 15 and with the inclusion of the ceramic ferrite components so that the resultant string or thread 21 will still be sensor detectable. It is also possible to select whether only the hot melt adhesive 15 used on the glue dots or drops 18 and 19, only the strings or threads 21 or both will be fabricated including the sensor detectable components discussed above.

In use of the paper supply roll leading edge securement in accordance with the present invention, a fresh supply paper roll, which has previously been prepared at a central location and which has been provided with the beads 8, the drops 16, or the dots 18 and 19 of the hot melt adhesive 15 together with their associated strings or threads 21, all of which are located on the leading edge 6 of the first paper layer 2 and on the second layer 9, is loaded onto a suitable roll changer. This paper supply roll is then rotated by the roll changer until suitable scanning means, such as sensors (not shown) detect the presence of the sensor detectable constituents of the hot melt adhesive 15 and of the threads or strings 21. The use of the ceramic ferrite or metal constituents in the beads 8, the drops 16, the dots 18 and 19 and the strings or threads 21 render these holding adhesive elements sensor detectable.

Once these sensor detectable constituents have been detected, suitable electronic controls and the roll changer drive assembly can be used to locate the paper supply roll leading edge or start 6 at the proper location. Once this has been done, a glue application device of generally conventional construction can be moved along the leading edge or start 6 of the paper web to apply the strip shaped connecting adhesive 7. This adhesive application device can be, for example a fan jet spray device which is placed on a carriage. This fan jet spray device will apply the connecting adhesive 7 to the leading edge 6 of the first layer 2 of the paper web in the form of an actively adhesive glue strip, as depicted in FIGS. 1 to 3. The leading edge 6 of the first layer 2 of the paper web on the paper supply roll preferably extends across the paper supply roll in a direction which is parallel to the axis of rotation of the paper supply roll. Once the strip shaped connecting adhesive 7 has been applied to the first layer 2 of the paper web on the paper supply roll, the leading edge 6 of the new roll can be attached to the web from the depleted roll during a flying roll change, as is, for example, described in German Patent Publication DE 42 10 329 A1. Instead of using a glue application device to apply the strip shaped connecting adhesive 7, it would also be possible to apply this adhesive 7 in the form of a two sided glue strip. This glue strip could be applied either manually or by machine.

As described previously, once the flying roll change has been accomplished, several of the printed products will include the connecting adhesive 7 as well as the beads 8, the drops 16, or the dots 18 and 19 as well as the threads or strings 21. These may be detected by a second group of sensors that can be placed after the folding devices in a web-fed rotary printing press. These sensors also sense the sensor detectable constituents, such as the ceramic ferrite or the metal particles. Once these sensors detect the presence of the sensor detectable constituent, a so-called waste shunt can be actuated by suitable electronic controls and drive assemblies so that the faulty products can be shunted aside and out of the stream of printed products.

It is also possible, in accordance with the present invention to utilize particularly dark color particles as the sensor detectable constituents instead of the ceramic ferrite or the metal particles. These dark color particles are added to the hot melt adhesive 15 or to the strings or threads 21. The sensors used now are activated by the presence of the dark color particles but otherwise now operate in the same manner to detect the presence of the glue beads 8, the glue drops 16, or the glue dots 18 and 19 together with their associated strings or threads 21. Once these color actuated sensors are activated, they will trigger the same operations as previously discussed. These sensors operate on the basis of color difference instead of on the basis of recognition of the ceramic ferrite or metal particles. It would also be possible to mix other types of sensor detectable constituents with the hot melt adhesive 15 and to the threads or strings 21 in accordance with the present invention.

While preferred embodiments of a paper supply roll leading edge securement in accordance with the present invention have been set forth fully and completely hereinabove, it will be apparent to one of skill in the art that a number of changes in, for example, the overall size of the paper supply roll, the type of web-fed printing press used, the particular connecting adhesive used, and the like could be made without departing from the true spirit and scope of the present invention which is accordingly to be limited only by the following claims.

What is claimed is:

1. A paper supply roll leading edge securement usable to attach a leading edge of a first layer of paper of said paper supply roll to a second layer of paper of said paper supply roll, said securement being in the form of a plurality of glue dots positioned on said first layer of paper adjacent said leading edge, and a plurality of glue dots positioned on said second layer of paper, each of said first layer dots being joined to a corresponding one of said second layer dots by a string, said securement including a sensor detectable constituent.

2. The paper supply roll leading edge securement of claim 1 wherein said sensor detectable constituent is selected from the group consisting of ceramic ferrite, metal particles and color components.

3. The paper supply roll leading edge securement of claim 1 wherein said glue drops are a material that rapidly sets at room temperature.

4. The paper supply roll leading edge securement in accordance with claim 3 wherein said material is a hot melt adhesive.

5. The paper supply roll leading edge securement of claim 1 wherein each said string consists of a fiber material.

6. The paper supply roll leading edge securement of claim 5 further including at least one metal insert associated with each said string.

* * * * *